(12) United States Patent
Priel et al.

(10) Patent No.: US 9,335,805 B2
(45) Date of Patent: May 10, 2016

(54) METHOD AND APPARATUS FOR MANAGING POWER IN A MULTI-CORE PROCESSOR

(75) Inventors: Michael Priel, Hertzelia (IL); Anton Rozen, Gedera (IL); Leonid Smolyansky, Zichron Yakov (IL)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 254 days.

(21) Appl. No.: 13/989,280

(22) PCT Filed: Nov. 25, 2010

(86) PCT No.: PCT/IB2010/055416
§ 371 (c)(1),
(2), (4) Date: May 23, 2013

(87) PCT Pub. No.: WO2012/069881
PCT Pub. Date: May 31, 2012

(65) Prior Publication Data
US 2013/0238912 A1  Sep. 12, 2013

(51) Int. Cl.
G06F 1/26 (2006.01)
G06F 1/32 (2006.01)
G06F 9/50 (2006.01)

(52) U.S. Cl.
CPC *G06F 1/26* (2013.01); *G06F 1/324* (2013.01); *G06F 1/3296* (2013.01); *G06F 9/5094* (2013.01); *Y02B 60/1217* (2013.01); *Y02B 60/1285* (2013.01); *Y02B 60/142* (2013.01)

(58) Field of Classification Search
CPC ......... G06F 1/26; G06F 1/324; G06F 1/3296; G06F 1/3206; G06F 9/5094; Y02B 60/1217; Y02B 60/1285; Y02B 60/142
See application file for complete search history.

(56) References Cited

U.S. PATENT DOCUMENTS

| 7,043,405 | B2 | 5/2006 | Orenstien et al. |
| 7,865,751 | B2 * | 1/2011 | Monferrer et al. ............ 713/322 |
| 7,949,887 | B2 | 5/2011 | Gunther et al. |
| 2006/0282692 | A1 | 12/2006 | Oh |
| 2007/0180279 | A1 | 8/2007 | Sullam |
| 2008/0022076 | A1 * | 1/2008 | Krieger et al. ................ 712/220 |
| 2009/0138737 | A1 | 5/2009 | Kim et al. |
| 2009/0150695 | A1 | 6/2009 | Song et al. |
| 2009/0172375 | A1 * | 7/2009 | Rotem et al. ...................... 713/1 |
| 2009/0249094 | A1 * | 10/2009 | Marshall et al. .............. 713/320 |
| 2009/0328055 | A1 * | 12/2009 | Bose et al. .................... 718/105 |
| 2010/0153954 | A1 * | 6/2010 | Morrow et al. ............... 718/102 |
| 2010/0169692 | A1 | 7/2010 | Burton |
| 2011/0191602 | A1 * | 8/2011 | Bearden ..................... G06F 1/26 713/300 |
| 2012/0053897 | A1 * | 3/2012 | Naffziger .............. G06F 1/3206 702/182 |

OTHER PUBLICATIONS

International Search Report and Written Opinion correlating to PCT/IB2010/055416 dated Jun. 27, 2011.
Bergamashi R. et al: "Exploring Power Management in Multi-Core Systems", ASP-DAC '08 Jan. 21, 2008, Abstract and pp. 708 and 710.

* cited by examiner

*Primary Examiner* — Dennis M Butler (57) ABSTRACT

There is provided a method of managing power in a multi-core data processing system having two or more processing cores, comprising determining usage characteristics for the two or more processing cores within the multi-core processing unit, and dependent on the determined usage characteristics, adapting a frequency or voltage supplied to each of the two or more processing cores, and/or adapting enablement signals provided to each of the two or more processing cores. There is also provided an apparatus for carrying out the disclosed method.

8 Claims, 6 Drawing Sheets

METHOD AND APPARATUS FOR MANAGING POWER IN A MULTI-CORE PROCESSOR

FIELD OF THE INVENTION

This invention relates to data processing systems in general, and in particular to an improved apparatus and method for managing power in a multi-core processor.

BACKGROUND OF THE INVENTION

Data processing systems, such as PCs, mobile tablets, smart phones, and the like, often comprise a multi-core design, typically in the form of a multi-core processor. The multiple cores may also be formed as part of a System-on-Chip (SoC).

High-frequency multi-core designs are faced with several technical issues that need to be over come. These include suffering from high power utilisation (and dissipation) when all cores are operating at full speed and issues arising from running both software optimised for multi-core environments and software non-optimised for multi-core environments.

SUMMARY OF THE INVENTION

The present invention provides a method and apparatus for managing power in a multi-core data processing system having two or more processing cores as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the present invention may, for the most part, be implemented using electronic components and circuits known to those skilled in the art, details will not be explained in any greater extent than that considered necessary for the understanding and appreciation of the underlying concepts of the present invention and in order not to obfuscate or distract from the teachings of the present invention.

Figure 1:
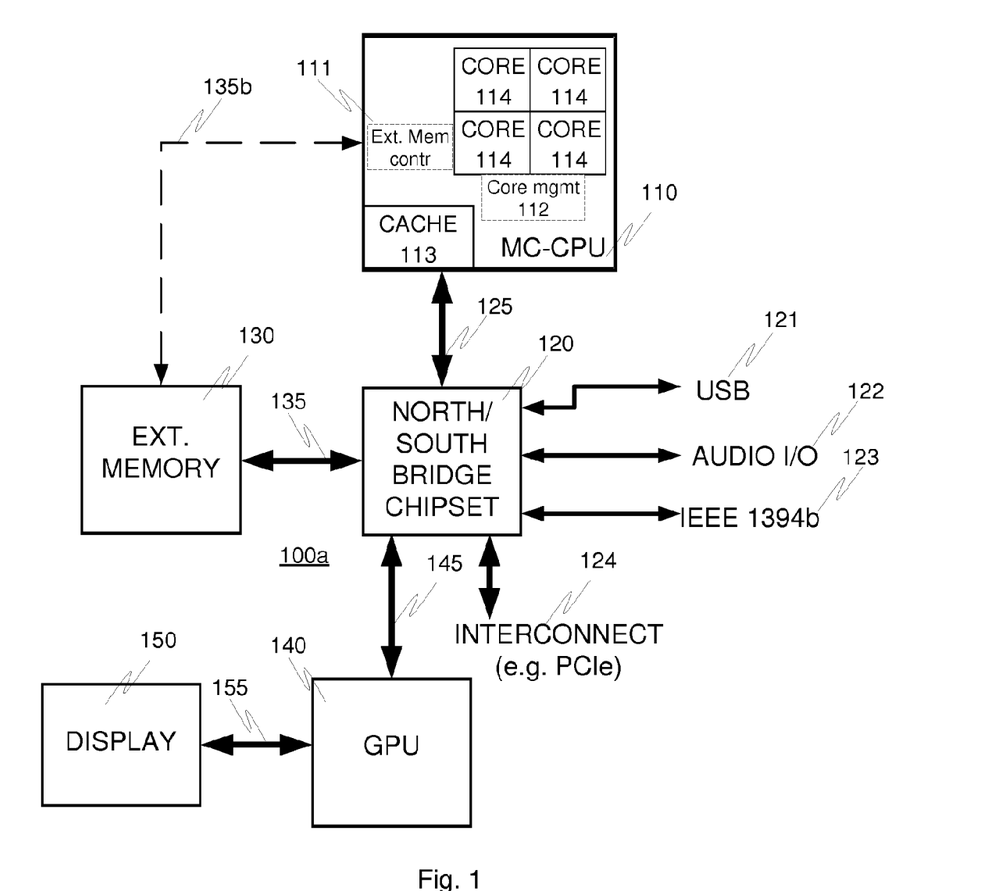
FIG. 1 schematically shows a block chart of a first example of a data processing system having a multi-core processor according to an embodiment of the present invention.

FIG. 1 schematically shows a first example of a data processing system 100a to which embodiments of the present invention may apply. It is a simplified schematic diagram of a typical desktop computer configuration having a multi-core central processing unit (CPU) 110 having four separate processing cores 114, and including a level 2 cache memory 113 and a core management entity 112. The core management entity 112 directs the utilisation of the cores during data processing, including but not limited to adjusting the operating frequency/power of each core individually, individually enabling/disabling the cores, and the like, with regard to operating characteristics of both the hardware and software being used, as discussed in more detail below.

The multi-core CPU 110 is connected to a North/South bridge chipset 120 via interface 125. The North/South bridge chipset 120 acts as a central hub, to connect the different electronic components of the overall data processing system 100a together, for example, the main external system memory 130, discrete graphics processing unit (GPU) 140, and external connections such as Universal Serial Bus (USB) 121, Audio Input/Output (I/O) 122, IEEE 1394b 123, system interconnect (e.g. PCIe, and the like) 124, and in particular to connect them all to the CPU 110.

In the example shown in FIG. 1, main external system memory 130 (e.g. DDR random access memory) may connect to the North/South bridge chipset 120 through external memory interface 135, or, alternatively, the CPU 110 may further include an integrated high speed external memory controller 111 for providing the high speed external memory interface 135b to the main external system memory 130. In such a situation, the main external system memory 130 may not use the standard external memory interface 135 to the North/South bridge chipset 120. The integration of the external memory controller 111 into the CPU 110 itself is seen as one way to increase overall system data throughput, as well as reducing component count and manufacturing costs whilst increasing reliability and the like.

The discrete graphics processing unit (GPU) 140 may connect to the North/South bridge chipset 120 through dedicated graphics interface 145 (e.g. Advanced Graphics Port—AGP), and to the display 150, via display interconnect 155 (e.g. Digital Video Interface (DVI), High Definition Multimedia Interface (HDMI), D-sub (analog), and the like). In other examples, the discrete GPU 140 may connect to the North/South bridge chipset 120 through some non-dedicated interface/interconnect, such as Peripheral Connection Interface (PCI—an established parallel interface standard) or PCI Express (PCIe—a newer, faster serialised interface standard), or other similarly capable interfaces (standard or non-standard).

Other peripheral devices may be connected through the other dedicated external connection interfaces such as USB 121, Audio Input/Output interface 122, IEEE 1394a/b interface 123, Ethernet interface (not shown), main interconnect 124 (e.g. PCIe), or the like. Different examples of the present invention may have different sets of external connection interfaces present, i.e. the invention is not limited to any particular selection of external connection interfaces (or indeed internal connection interfaces).

The integration of interfaces previously found within the North/South bridge chipsets 120 (or other discreet portions of the overall system) into the central processing unit 110 itself has been an increasing trend (producing so called "system-on-chip" (SoC) designs). This is because integrating more traditionally discrete components into the main CPU 110 reduces manufacturing costs, fault rates, power usage, size of end device, and the like.

Figure 2:
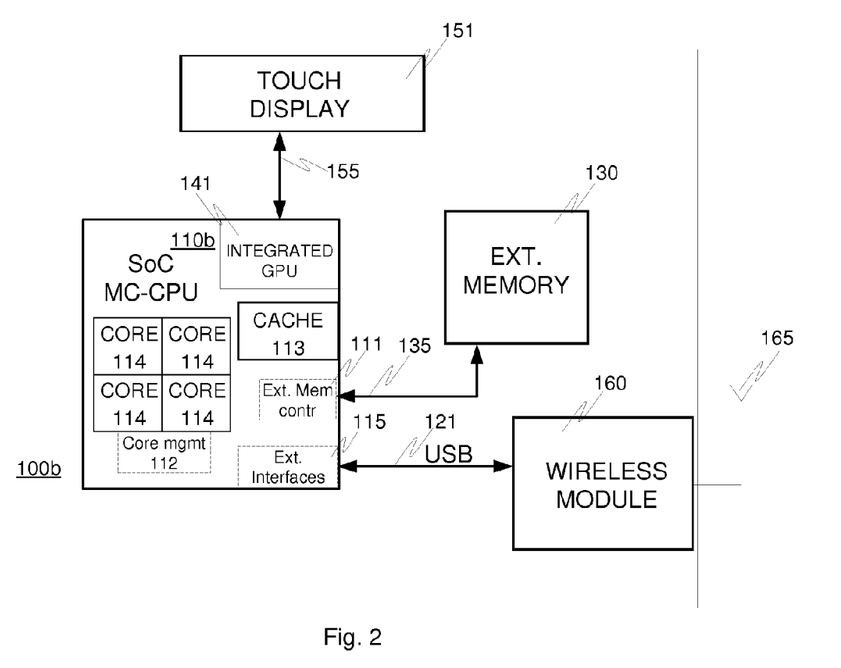
FIG. 2 schematically shows a block chart of a second example of a data processing system having a SoC multi-core processor according to an embodiment of the present invention.

FIG. 2 schematically shows a second, more integrated, example of an embodiment of a data processing system 100*b* to which the present invention may apply. In this example, the data processing system is simplified compared to FIG. 1, and it represents a commoditised mobile data processing system, such as a tablet computing device.

The mobile data processing system 100*b* of FIG. 2 comprises a SoC multi-core CPU 110*b* having four processing cores 114, and including an integrated cache memory 113, integrated core management entity 112 (operating in a very similar way as for FIG. 1), integrated GPU 141, integrated external memory interface 111, and other integrated external interfaces 115. In this case, all of the other parts of the system directly connect to the integrated CPU 110*b*, such as main external system memory 130 via interface connection 135, a touch display 151 via bi-directional interface 155, and a wireless module via USB interface 121. The bi-directional touch interface 155 is operable to allow the display information to be sent to the touch display 151, whilst also allowing the touch control input from the touch display 151 to be sent back to the CPU 110*b* via integrated GPU 141.

The wireless module also comprises an antenna 165, for receiving and transmitting wireless communication signals. The mobile data processing system 100*b*, and in particular the external interfaces 115, may also include any other standardised internal or external connection interfaces (such as the IEEE1394b, Ethernet, Audio Input/Output interfaces of FIG. 1). Mobile devices in particular may also include some non-standard external connection interfaces (such as a proprietary docking station interface). This is all to say that the present invention is not limited by which types of internal/external connection interfaces are provided by or to the mobile data processing system 100*b*.

Typically, in such consumer/commoditised data processing systems, a single device 100*b* for use worldwide may be developed, with only certain portions being varied according to the needs/requirements of the intended sales locality (i.e. local, federal, state or other restrictions or requirements). For example, in the mobile data processing system 100*b* of FIG. 2, the wireless module may be interchanged according to local/national requirements. For example, an IEEE 802.11n and Universal Mobile Telecommunications System (UMTS) wireless module 160 may be used in Europe, whereas an IEEE 802.11n and Code Division Multiple Access (CDMA) wireless module may be used in the United States of America. In either situation, the respective wireless module 160 is connected through the same external connection interface, in this case the standardised USB connection 121.

Regardless of the form of the data processing system (100*a* or 100*b*), the way in which the multi-core processor operates is generally similar. In operation, data processing system (100*a/b*) functions to implement a variety of data processing functions by executing a plurality of data processing instructions (i.e. the program code and content data) across the multiple processing cores 114. The cache memory 113 is a temporary data store for frequently-used information that is needed by the multiple processing cores of the central processing unit 110/*b*. The plurality of data processing instructions are often split into individually executable tasks, or threads, which interact with one another to carry out the overall function of the application(s)/program(s) being executed on the multi-core data processing system. These tasks maybe executed on separate cores, depending on the workload of the overall data processing system. A single application may be formed from a plurality of tasks/threads. Equally, multiple single task applications may be executed concurrently. The described method and apparatus may apply in either situation or mix of the two, thus reference to any of 'application, program, thread or task' may, in the main, be understood as a reference to any of these forms of computer code, where applicable.

General use scenarios (i.e. use-cases) for multi-core data processing systems often don't require full use of all the available performance of the multi-core CPU. Therefore, the executing application(s)/program(s)/thread(s)/task(s) can be separated and load-balanced across multiple cores. Typically, there may be two or more options available for inter-core load balancing, including:

Running the application on a lower number of cores but each operating at a higher load, e.g. a single core operating at high frequency and high voltage;

Running the application on a higher number of cores but each at a lower load, e.g. several cores operating at low frequency and low voltage.

Figure 3:
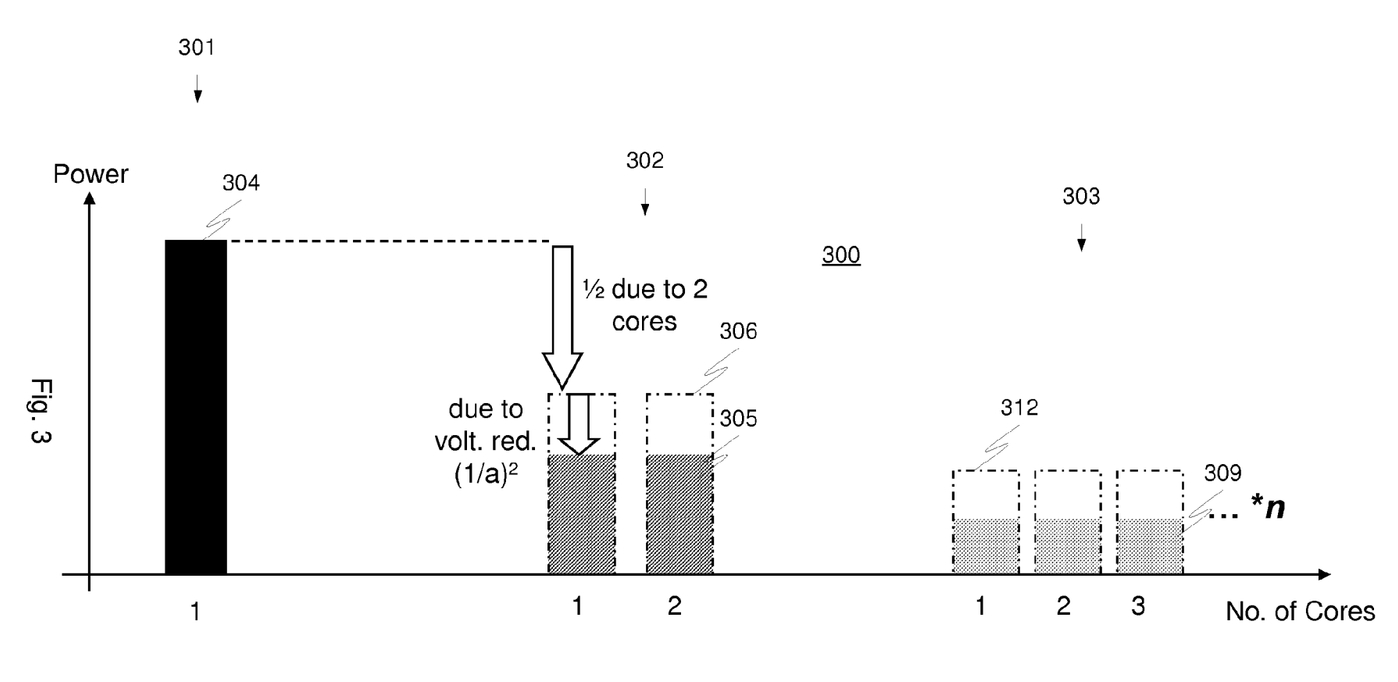
FIG. 3 graphically shows a simplified overview of how power consumption of cores within a multi-core system varies according to the number of cores enabled.

FIG. 3 shows a simplified overview 300 of how power consumption of cores within a multi-core system varies according to the number of cores enabled. The graph shows three use scenarios: single operating core 301; two operating cores 302; and three operating cores 303.

In a multi-core environment, if more processing cores are enabled, then to get a predetermined amount of computation done allows each processing core to reduce its operating frequency. In a homogenous multi-core system, the frequency reduction can be done equally across all processing cores by a factor inversely proportional to the number of operating cores, i.e. they each have the same relative reduction factor applicable. This is because each processing core carries out less computation per unit of time, but there are more computational units (i.e. processing cores) working together to provide the total processing amount. In a basic example, if there are twice as many processing cores available, the processing frequency can halve, whereas if there are three processing cores, the processing frequency may be reduced by a factor of 3. This is shown in FIG. 3 as the difference between the heights of the power bar level 304 for a single processor core scenario 301, when compared to the two theoretical power bar levels 306 of the two core version 302, and the three theoretical power bar levels 312 of the three core version 303. In heterogeneous multi-core environments, a similar approach applies, but with variation in the relative changes in frequency allowed according to the relevant types of processing resources (i.e. core) provided.

Furthermore, at least partly due to physical properties of integrated circuits, power consumption of an integrated circuit is proportional to its operating frequency and the square of its operating voltage. Thus, as processing cores reduce their operating frequency, the amount of power they each actually require to carry out the necessary calculations drops proportionally. Thus, the reduction of power required by a processing core (i.e. power saving) is related to both the number of processing cores and their operating frequency, and may be incrementally better as the number of processing cores used increases. This operating voltage power reduction in combination with the reduction in power due to the number of processing cores being used, results in a lower combined total power bar level in both the two-core example (power bar level 305) and in the three-core example (power bar level 309)

From this understanding, it can be seen that since the power consumption is most effective on low voltages (because power consumption is proportional to the square of the voltage, see equations below), in lower power envelope scenarios, it may be justified to use more processing cores operating at lower frequency and voltage, than would otherwise be the case:

$$\text{Single Core Power (301)} \quad P_1 = C * V^2 * F$$

$$\begin{aligned}\text{Two Core Power (302)} \quad P_2 &= 2 * (C * (V/a)^2 F/2) \\ &= C * V^2 * F * (1/a)^2 \\ &= P_1 * (1/a)^2\end{aligned}$$

$$\begin{aligned}\text{N-Core Power} \quad P_1 &= n * (C * (V/b)^2 F/n) \\ &= C * V^2 * F * (1/b)^2 \\ &= P_1 * (1/b)^2\end{aligned}$$

Where C=parasitic capacitances of all component of multi-core processor;
V=operating voltage;
F=operating frequency;
a=relative voltage reduction applicable due to corresponding frequency reduction for 2 core scenario;
b=relative voltage reduction applicable due to corresponding frequency reduction for n-core scenario.

The above equation shows that as there are more processing cores operating, the frequency can reduce, resulting in less voltage required, resulting in doubly lower overall power consumption. Thus, it can be appreciated that 'artificially' spreading an application(s) across multiple processing cores may be preferable to running the same application(s) on a single processing core.

However, in real world scenarios, taking such a straight forward approach may result in an opposite outcome—i.e. more power is actually used/wasted. One reason for this to happen is because the particular application being executed/used may not split well over multiple processing cores. This is to say, it is an application that is not easily parallelized.

Another reason may be that there is a theoretical limit to the amount of power that may be saved in a particular processing core through voltage/frequency reduction, due to leakage currents in the multi-core integrated circuit, and in particular in that processing core/type of processing core. Leakage currents may result in wasted power in a processing core, and where the same particular core structure is used multiple times in a homogenous multi-core environment, the leakage currents will be largely similar for each processing core. Thus the leakage current losses increase proportionally to the number of processing cores in operation.

Leakage of the processing cores may be considerable when compared to the dynamic power usage requirements of the processing cores (i.e. the dynamically changing power load which is dependent on the core processing load) in certain constructions, and especially at higher operating temperatures.

Furthermore, there is an over-arching constraint to ensure that the multi-core processor never exceeds a predetermined transistor junction temperature ($T_j$), which is the maximum allowed temperature of the actual transistor silicon junctions, in to avoid transistor degradation through ion/electron migration.

Figure 4:
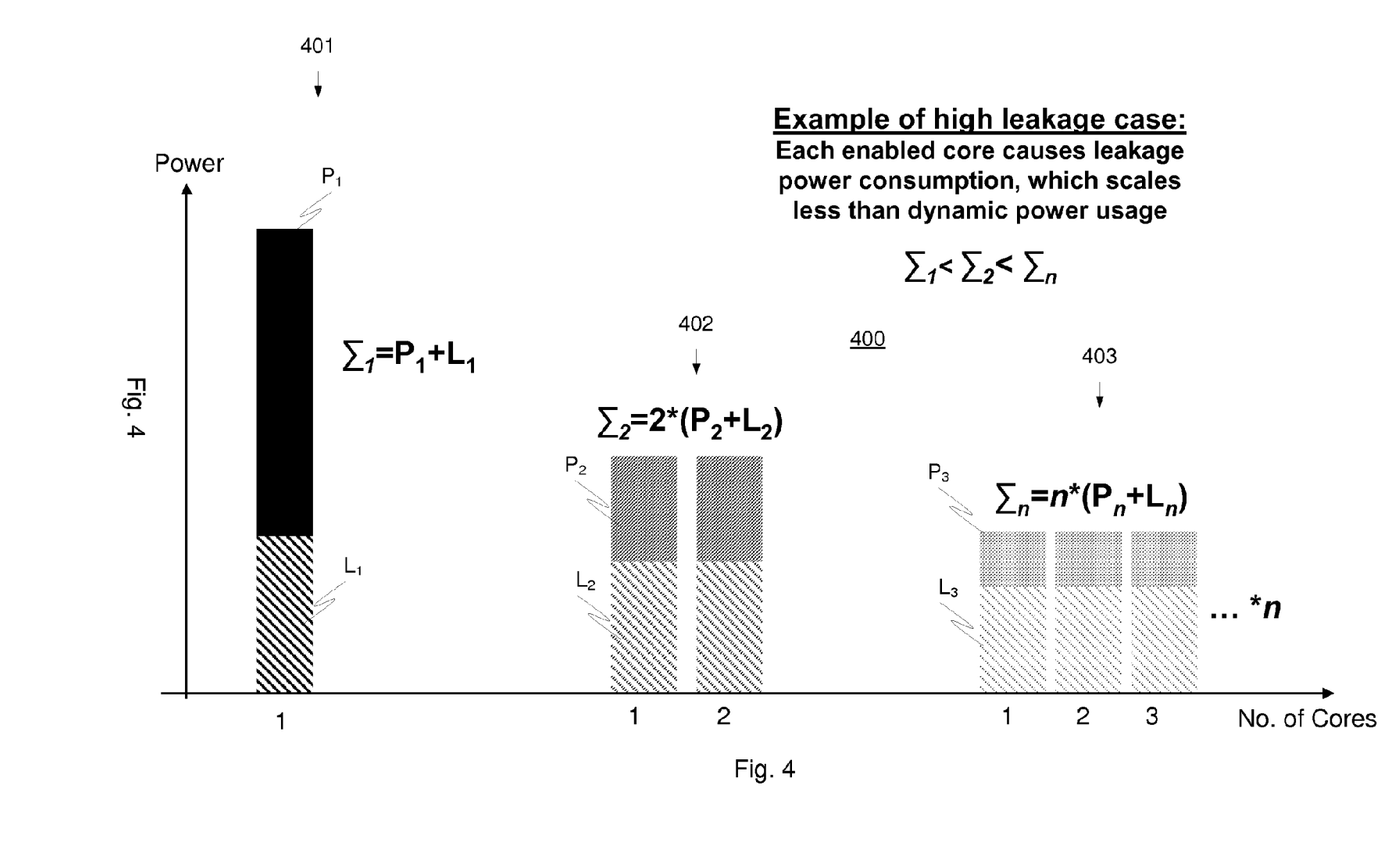
FIG. 4 graphically shows how power consumption of cores within a multi-core system varies according to the number of cores enabled, in an exemplary high leakage current scenario.

FIG. 4 shows the effects 400 of high leakage currents in a multi-core integrated circuit, and in particular how it affects the power usage of each enabled processing core in a homogenous multi-core processor.

The total power consumption for a single processing core scenario 401 is the sum of the dynamic power component $P_1$ and the leakage power component $L_1$ (i.e. $\Sigma_1 = P_1 + L_1$).

The total power consumption for a two-core scenario 402 is two times the sum of the dynamic power component $P_2$ and the leakage power component $L_2$ (i.e. $\Sigma_2 = 2*(P_2 + L_2)$).

The total power consumption for a n-core multi-core scenario 403 is n times the sum of the dynamic power component $P_n$ and the leakage power component $L_n$ (i.e. $\Sigma_n = n*(P_n + L_n)$).

It can be seen that each enabled processing core causes leakage current, hence leakage power consumption, and that the leakage power consumption scales less than the dynamic power consumption.

Figure 5:
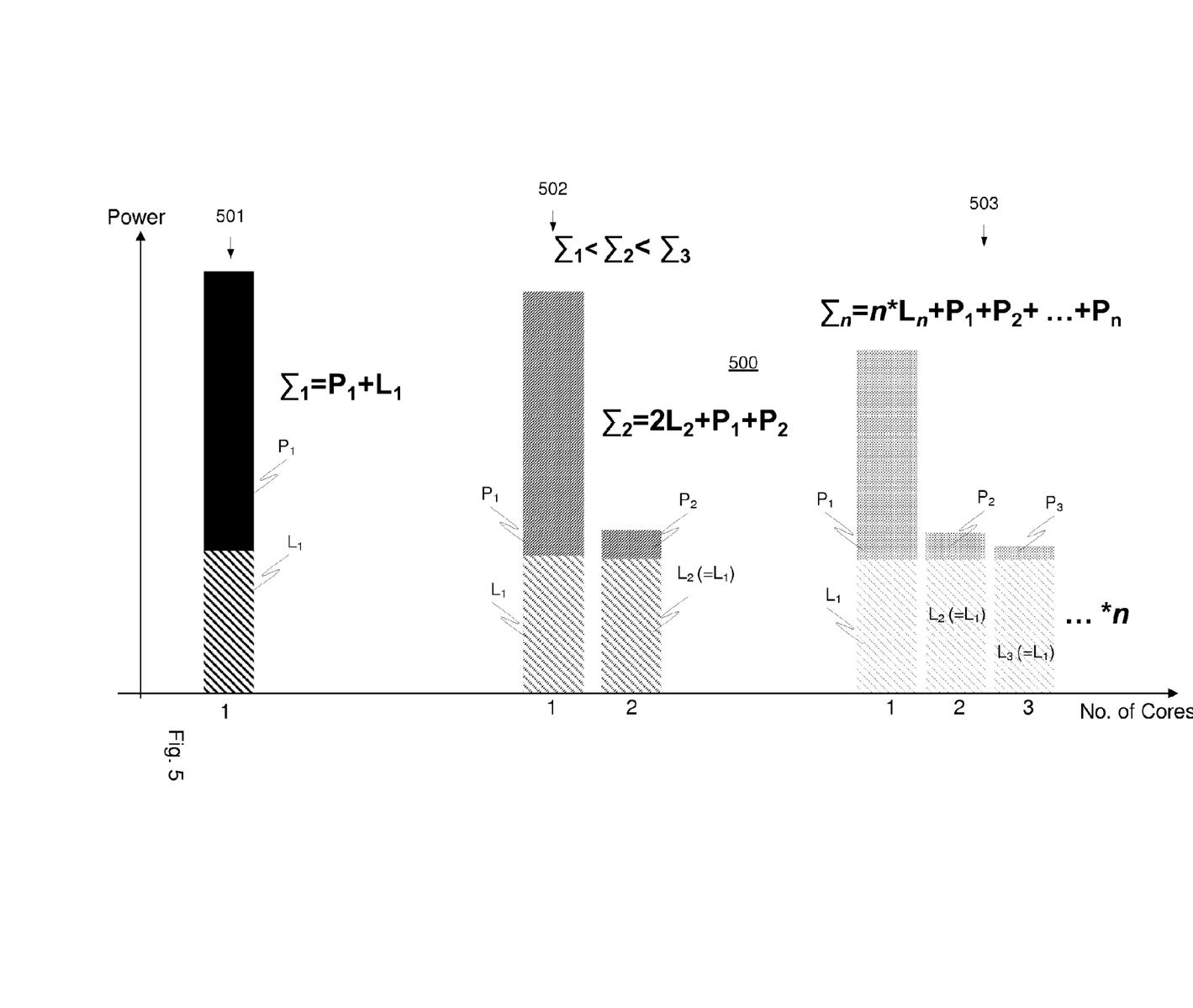
FIG. 5 graphically shows how power consumption of cores within a multi-core system varies according to the number of cores enabled, in an exemplary low split-ability application scenario.

FIG. 5 shows how power consumption 500 of processing cores within a multi-core system varies according to the number of processing cores enabled in an exemplary low split-ability application scenario. In particular, there is shown the situation for a single processing core (501), two processing cores (502) and multiple (n) processing cores (503).

"Low split-ability" is where an application does not split well across multiple processing cores, for example due to the application having a low level of inherent parallelism. In this sort of situation a high load may be caused on the main processing core (i.e. typically the first numbered processing core, which is the first to be used by any application. However, any other selection of "main core" may also be used). This may prevent a common frequency and voltage level from being assigned to the multi-core processor, since there is a disparity in operating levels required by each processing core—see examples 502 and 503 in particular. From the previous figure, we know that each enabled processing core causes leakage current, and hence increases total leakage power consumption.

Therefore, it is proposed that the decisions regarding the frequency/voltage scaling applied across a multi-core processor (including any decisions on a particular processing core's enable/disable status) may take into consideration one or more of the following additional new parameters:

The 'split-ability' of the particular application being run/executed on the multi-core processor, which is the ability of the respective program(s) to be split over multiple processing cores for execution (i.e. it is the program(s)'s level of achievable/potential parallelism). One approach to determining the "split-ability" is to run the program on a single-core enabled processor and then analyse what sort of tasks and what number of tasks are executed on the single processing core. If there are only a few (or even a single) task(s) running on the single core, then the inherent split-ability of that program is low. However, if there are many separate tasks running on the single core, there is a high degree of "split-ability" in the program. This analysis stage may be either carried out on an actual single core processor, or a multi-core processor with all but one processing core disabled. In such a case, if the processing cores are heterogeneous, the method is further improved by carrying out multiple analysis stages, with each type of processing core being used at least once for one of the analysis stages, so that a complete picture of the overall capabilities of each type of processing core is known. The "split-ability" analysis stage may be carried out offline or online, i.e. during compilation, or "on-the-fly" during actual execution of the respective application. However, the earlier the determination of application split-ability, the better the response may be. A similar 'split-ability' analysis may be carried out on a group of applications to be/being executed concurrently. In this case, whether the multi-core processor is heterogenous or homogenous may be more influential, as particular cores may be better or worse at carrying out certain tasks.

An estimation of the dynamic power characteristics of individual (e.g. in a heterogeneous multi-core processor environment) or multiple cores in multi-core processor (e.g. in a homogenous multi-core processor environment). This is to say, an estimation of how much power a single processing core uses vs how much power a multiple processing core implementation will take in terms of dynamic power usage, as explained with reference to FIGS. 3-5.

The thermal junction limit $T_j$ for the particular processing core (e.g. in a heterogeneous multi-core processor environment) or for all cores (e.g. in homogenous multi-core processor environment).

An estimation of leakage power characteristics of individual (e.g. in heterogeneous multi-core) or multiple cores in multi-core processor (e.g. in homogenous implementation), i.e. how much power a single core vs how much power a multiple core implementation will take in terms of leakage power usage, as explained with reference to FIGS. 3-5.

Leakage power may be related to a particular part (i.e. the whole multi-core processor), or individual processing core, production parameters/characteristics and temperature (in particular, the (expected) operating temperature).

Figure 6:
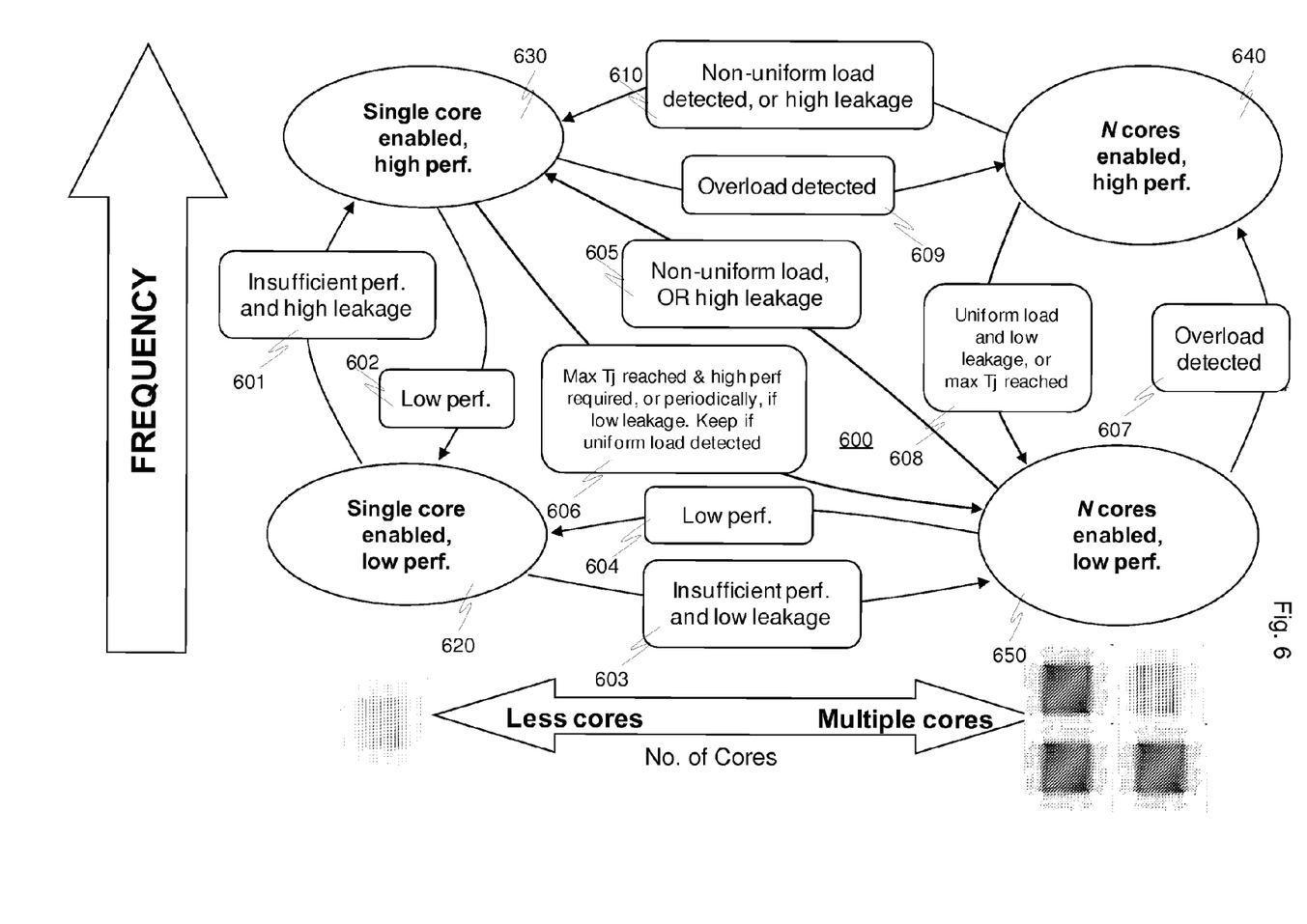
FIG. 6 shows a high level schematic flow diagram of the method according to an embodiment of the present invention.

FIG. 6 shows a simplified high level schematic flow diagram 600 of the method of managing power in a multi-core processing environment according to an embodiment of the present invention. In particular, this figure is a state transition diagram with frequency on the Y axis, and the number of cores in use on the X axis. A power management entity may then move the multi-core processor between the different states according to tested parameters affecting the multi-core processor, as described in more detail below.

In this simplified example, there are four main states within which the multi-core processor may reside: 'single core enabled, low performance' state 620; 'single core enabled, high performance' state 630; 'N cores enabled, high performance' state 640; and 'N cores enabled, low performance' state 650. The number of cores enabled in each state is self evident. Meanwhile, 'low performance' means running the core(s) at low frequency/power use levels, and 'high performance' means running the core(s) at high frequency/power use levels.

Taking the arbitrary starting point of being in state 620 (there being a single processing core enabled, operating at low performance), the core management entity 112 may determine that there is insufficient overall performance being provided. Hence, more performance is required, and may be provided (as discussed in more detail above) by either increasing individual processing core performance, or through simply enabling more processing cores.

However, if each processing core has a relatively high leakage current characteristic, it is not considered realistic to provide increased performance through simply enabling/operating more (high leakage) processing cores, since the increased high leakage current (and hence high power waste) would be prohibitive for multi-core simultaneous running.

Therefore, the state is transitioned 601 to one in which there is a single processing core enabled, but operating at (very) high performance (state 630).

In an opposite situation, i.e. where there is already too much performance available (and there is a high leakage current), the method may then transition from the 'single core enabled, high performance' state 630 to the 'single core enable, low performance' state 620 through the "low performance required" transition 602.

Alternatively, when in state 620 ('single core, low performance'), if a similar 'higher performance required' transition occurs, but where the respective processing cores do not have high leakage current problems (i.e. transition 603), it may be beneficial to provide the increased performance by enabling more processing cores rather than making a single processing core operate individually at higher performance. Thus, there may be a transition to the 'N cores enabled, low performance' state 650. The opposite transition 604 may occur when only low performance is required, so it is not necessary to maintain a larger number of running processing cores.

When in state 650 ('N cores enabled, low performance'), if there subsequently occurs a situation where either the application(s) being executed/to be executed is/are of low split-ability (i.e. not easily parallelised) or the leakage current for each enabled processing core is high (e.g. the multi-core processor is operating in higher than expected temperatures), then the core management entity 112 can transition the cores 605 in a multi-core processor to state 630 instead, i.e. to a state in which only a single processing core is enabled, but at high performance. This may also happen if, for example, the junction temperature (Tj) falls back below a target level, indicating a single high performance processing core may suffice. The opposite transition 606 may occur, i.e. move from the 'single core enabled, high performance' state 630 to the 'N cores enabled, low performance' state 650, if for example, a maximum junction temperature ($T_j$) is reached and high(er) performance is still required. This may occur periodically where low leak currents are present. The 'n-cores enabled, low performance' state 650 may be kept if uniform load is detected also.

When in state 650, an alternative approach to providing more performance (especially when there is some form of overload detected—transition 607) is to transition to state 640 ('N cores enabled, high performance'), especially when the individual leakage currents for the processing cores is low and the application(s) being/to be executed is/are more uniform and easily parallelised. Where the maximum specified junction temperature (Tj) has been reached by a multi-core processor, then this way of providing more performance is particularly useful. Where there is a need to reduce junction temperature (Tj) whilst maintaining or increasing performance, then it is not possible to use any increases in individual processing core performance levels, and generally the increased performance can only be achieved by increasing the number of processing cores operating.

There is an additional benefit to enabling more processing cores, in that hotspots on the integrated circuit forming the multi-core processor may be avoided or spread out more evenly across the physical surface of the integrated circuit. It is also possible to use integrated temperature sensors within the multi-core processor itself to detect junction temperatures (Tj), and to locate hotspots so that they may be avoided (e.g. by spreading out the load to other processing cores within the multi-core processor). Also, processing may be moved to different equivalent processing cores (i.e. moving processing from an enabled processing core to a currently disabled but identical processing core, and disabling the originating processing core) if an originating processing core is getting too hot, for example, if it is immediately adjacent another operating processing core.

In the opposite direction, i.e. going from state 640 to state 650, similar uniform load, low leakage and junction temperature considerations apply, and are shown as transition 608.

When in state 640 ('N cores enabled, high performance'), a transition towards state 630 ('single core enabled, high performance') might be required, for example when a non-uniform load is detected, or there is high leakage per enabled processing core—transition 610. In the opposite direction, a transition may occur from state 630 to state 640 when, for example, an overload occurs (where there is a requirement for processing power beyond what a single core is physically capable of providing —609).

Since it is usually preferable to take measured steps to match power usage of a multi-core processor to the processing requirement loads, transitions between the two extreme states 620 and 640 (i.e. 'single core enabled, low performance' and 'N cores enabled, high performance'). typically occur through one of the other two, more intermediate states 630 and 650 and not directly. However, a direct transition (not shown) may equally be used when the processing power needs are extremely contrasting.

The above description of FIG. 6 shows and explains the main considerations for the power management entity when deciding on what processing cores to enable/disable, and what power and frequency levels to apply to the enabled cores. The exact choice of power options to apply to the processing cores is variable according to the inherent characteristics of the hardware and software being used together, as well as the environment they are operating in. Pre-testing those characteristics through simulation or dry runs may be required for optimum multi-core power management.

Accordingly, examples show a method of managing power in a multi-core processing environment, and in particular within data processing systems having a multi-core processor therein.

The above described method and apparatus may be accomplished, for example, by adjusting the structure/operation of the data processing system, and in particular, the core power management entity 112 within the multi-core processor.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD ROM, CD R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

Computer readable media may be permanently, removably or remotely coupled to an information processing system such as data processing system 100*a/b*.

Some of the above examples of embodiments, as applicable, may be implemented in a variety of different information/data processing systems. For example, although the figures and the discussion thereof describe exemplary information processing architectures, these exemplary architectures are presented merely to provide a useful reference in discussing various aspects of the invention. Of course, the description of the architectures has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in some embodiments, the illustrated elements of data processing systems 100*a/b* are circuitry located on a single integrated die or circuit or within a same device. Alternatively, data processing systems 100a/b may include any number of separate integrated circuits or separate devices interconnected with each other. For example, power management entity 112 may be located on a same integrated circuit as CPU 110 or on a separate integrated circuit or located within another peripheral or slave discretely separate from other elements of data processing system 100a/b. Also for example, data processing system 100a/b or portions thereof may be soft or code representations of physical circuitry or of logical representations convertible into physical circuitry. As such, data processing system 100a/b may be embodied in a hardware description language of any appropriate type.

However, other modifications, variations and alternatives are also possible. The specifications and drawings are, accordingly, to be regarded in an illustrative rather than in a restrictive sense.

As discussed, in one embodiment, data processing system is a computer system such as a personal computer system 100a. Other embodiments may include different types of computer systems, such as mobile data processing system 100b. Data processing systems are information handling systems which can be designed to give independent computing power to one or more users. Data processing systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A data processing system processes information according to a program (i.e. application) and produces resultant output information via I/O devices. A program is a list of instructions such as a particular application program and/or an operating system. A computer program is typically stored internally on computer readable storage medium or transmitted to the computer system via a computer readable transmission medium, such as wireless module 160. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

The term "coupled," as used herein, is not intended to be limited to a direct coupling or a mechanical coupling.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

In the foregoing specification, the invention has been described with reference to specific examples of embodiments of the invention. It will, however, be evident that various modifications and changes may be made therein without departing from the broader spirit and scope of the invention as set forth in the appended claims.

The invention claimed is:

1. A method of managing power in a multi-core data processing system having a plurality of processing cores, comprising:
   determining a first performance status and a first leakage status for a first processing core of the plurality of processing cores;
   setting a first performance setting for the first processing core to a high-performance state in response to the first performance status comprising a low-performance state and the first leakage status comprising a high-leakage state, wherein the high-leakage state is higher than a low-leakage state;
   determining a second leakage status for a second processing core of the plurality of processing cores;
   determining a load uniformity status for a load operating on the first processing core and the second processing core; and
   in response to the first leakage status comprising the high-leakage state, the second leakage status comprising the high-leakage state, and the load uniformity status comprising a non-uniform state:
      setting the first performance setting to the high-performance state; and
      setting an enablement setting for the second processing core to a disabled state.

2. The method of claim 1, further comprising:
   setting the enablement setting to an enabled state in response to the first performance status comprising the low-performance state and the leakage status comprising the low-leakage state.

3. The method of claim 1, further comprising:
   determining a second performance status for the second processing core; and
   setting the enablement setting to the disabled state in further response to the first performance status comprising the high-performance state and the second performance status comprising the high-performance state.

4. The method of claim 3, further comprising:
   determining a first junction-temperature status for the first processing core; and
   in response to the first leakage status comprising the low-leakage state and the first junction-temperature status comprising a high-junction-temperature state:
      setting the first performance setting to the low-performance state; and
      setting an enablement setting for a second processing core of the plurality of processing cores to an enabled state.

5. The method of claim 4, further comprising:
   determining a second junction-temperature status for a second processing core of the plurality of processing cores;

determining a load uniformity status for a load operating on the first processing core and the second processing core; and in response to the load uniformity status comprising a uniform state, and one of the first junction-temperature status and the second junction-temperature status comprising the high-junction-temperature state:

setting the first performance setting to the low-performance state; and setting a second performance setting of the second processing core to the low-performance state.

6. A method of managing power in a multi-core data processing system having a plurality of processing cores, comprising:

determining a first leakage status for a first processing core of the plurality of processing cores;

determining a second leakage status for a second processing core of the plurality of processing cores;

determining a load uniformity status for a load operating on the first processing core and the second processing core; and in response to the first leakage status comprising a high-leakage state, the second leakage status comprising the high-leakage state, and the load uniformity status comprising a non-uniform state:

setting a first enablement setting for the first processing core to an enabled state;

setting a first performance setting for the first processing core to a high-performance state and setting a second enablement setting for the second processing core to a disabled state.

7. The method of claim 6, further comprising:

in response to the load uniformity status comprising a uniform state;

setting the first performance setting to a low-performance state; and setting a second performance setting for the second processing core to the low-performance state.

8. The method of claim 6, further comprising:

determining a first performance status and a first junction-temperature status for the first processor core;

determining a second performance status for the second processor core; and in response to the first performance status comprising a high performance state, the second performance status comprising the high performance state, the load uniformity status comprising a uniform state, and the first junction-temperature status comprising a high-junction-temperature state;

setting the first performance setting to a low-performance state; and setting a second performance setting for the second processing core to the low-performance state.

* * * * *